(12) United States Patent
Bojiuc

(10) Patent No.: US 7,791,242 B2
(45) Date of Patent: Sep. 7, 2010

(54) DC INDUCTION ELECTRIC MOTOR-GENERATOR

(75) Inventor: Dumitru Bojiuc, Dana Point, CA (US)

(73) Assignee: Clearwater Holdings, Ltd.

( * ) Notice: Subject to any disclaimer, the term of this patent is extended or adjusted under 35 U.S.C. 154(b) by 665 days.

(21) Appl. No.: 11/209,525

(22) Filed: Aug. 22, 2005

(65) Prior Publication Data
US 2006/0038454 A1 Feb. 23, 2006

Related U.S. Application Data

(63) Continuation-in-part of application No. 11/200,920, filed on Aug. 9, 2005, now abandoned.

(60) Provisional application No. 60/603,444, filed on Aug. 20, 2004.

(51) Int. Cl.
H02K 15/02 (2006.01)
(52) U.S. Cl. .................. 310/200; 310/266; 310/114
(58) Field of Classification Search ......... 310/112–114, 310/166, 266, 181, 200, 154.01, 154.02, 310/154.06, 154.43
See application file for complete search history.

(56) References Cited

U.S. PATENT DOCUMENTS

| | | | | |
|---|---|---|---|---|
| 1,145,575 A * | 7/1915 | Eichert | .......... | 310/200 |
| 1,227,185 A * | 5/1917 | Neuland | .......... | 310/105 |
| 1,690,953 A * | 11/1928 | Schon | .......... | 318/769 |
| 2,507,399 A * | 5/1950 | Christensen | .......... | 310/166 |
| 2,539,459 A * | 1/1951 | Myrmirides | .......... | 310/113 |
| 2,762,939 A * | 9/1956 | Hodgson | .......... | 310/102 R |
| 2,864,017 A * | 12/1958 | Waltscheff | .......... | 310/126 |
| 3,137,800 A * | 6/1964 | Young | .......... | 310/212 |
| 3,729,642 A * | 4/1973 | Esters | .......... | 310/112 |
| 3,757,150 A * | 9/1973 | Benezech | .......... | 310/181 |
| 4,114,057 A * | 9/1978 | Esters | .......... | 310/46 |
| 4,459,501 A | 7/1984 | Fawzy | | |
| 4,565,938 A | 1/1986 | Fawzy | | |
| 4,623,809 A | 11/1986 | Westley | | |
| 4,978,878 A * | 12/1990 | Dijken | .......... | 310/268 |
| 5,030,867 A * | 7/1991 | Yamada et al. | .......... | 310/156.25 |
| 5,191,255 A | 3/1993 | Kloosterhouse et al. | | |
| 5,337,030 A | 8/1994 | Mohler | | |
| 5,744,895 A * | 4/1998 | Seguchi et al. | .......... | 310/266 |
| 5,793,136 A * | 8/1998 | Redzic | .......... | 310/114 |
| 6,507,257 B2 | 1/2003 | Mohler | | |
| 6,768,237 B1 * | 7/2004 | Schroedl | .......... | 310/114 |
| 6,803,691 B2 | 10/2004 | Rose | | |
| 6,998,757 B2 * | 2/2006 | Seguchi et al. | .......... | 310/266 |
| 2002/0135263 A1 | 9/2002 | Neal | | |
| 2004/0135452 A1 | 7/2004 | Tu et al. | | |

FOREIGN PATENT DOCUMENTS

WO WO 03075437 A1 * 9/2003

* cited by examiner

*Primary Examiner*—Dang D Le
(74) *Attorney, Agent, or Firm*—Gene Scott; Patent Law & Venture Group

(57) ABSTRACT

An electromagnetic apparatus has a rotating element acting as a transfer bridge between two active energetic suppliers, the rotating element providing a ferromagnetic core with plural solenoid coils having induced electric energy from external permanent magnets; the core transferring energy by induction to the inner stator's wound active permanent magnet, the energy collector and inductor acting as a generator.

8 Claims, 1 Drawing Sheet

DC INDUCTION ELECTRIC MOTOR-GENERATOR

RELATED APPLICATIONS

This application claims international priority from a prior filed U.S. Provisional Patent Application having Ser. No. 60/603,444 filed with the United States Patent Office on Aug. 20, 2004 and which is copending with this present non-provisional application. U.S. Ser. No. 60/603,444 is hereby incorporated herein by reference. This application is a Continuation-In-Part application of a prior filed U.S. Utility patent application having Ser. No. 11/200,920 and entitled "Monopole Field Electric Motor Generator" filed on Aug. 9, 2005 now abandoned.

BACKGROUND

1. Field of the Present Disclosure

This disclosure relates generally to electric motor-generators and more particularly to a DC rotating electromagnetic machine operating by induction.

2. Description of Related Art

The following art defines the present state of the field of the apparatus described and claimed herein:

Tu et al, US 2004/0135452, discloses a flat rotary electric generator that includes at least one toroidal coil structure for cutting magnetic lines to induce a current and at least one disc-shaped magnetic pole structure oriented parallel to the helical coil structure. If multiple toroidal coil structures and disc-shaped magnetic coil structures are included, the toroidal coil structures and disc-shaped magnetic coil structures are arranged in alternating manner. The toroidal coil structure and disc-shaped magnetic pole structure are not provided with a permeable material. When either the toroidal coil structures or the at least one disc-shaped magnetic pole structure is rotated by an external force, the toroidal coil structure cuts the magnetic lines passing therethrough to generate an induced current. Neal, US 2002/0135263, discloses a plurality of stator arc segments that form a toroidal core for a stator assembly used to make a motor. In a preferred embodiment, a plurality of magnetic fields is created when electrical current is conducted through wire wound around poles on the toroidal core. A monolithic body of phase change material substantially encapsulates the conductors and holds the stator arc segments in contact with each other in the toroidal core. Hard disc drives using the motor, and methods of constructing the motor and hard disc drives are also disclosed. Rose, U.S. Pat. No. 6,803,691, discloses an electrical machine that comprises a magnetically permeable ring-shaped core centered on an axis of rotation and having two axially-opposite sides. Coils are wound toroidally about the core and disposed sequentially along the circumferential direction. Each coil includes two side legs extending radially alongside respectively sides of the core. Coil-free spaces exist between adjacent side legs. A bracket has first and second side flanges that are connected by a bridging structure and respectively abut the first and second sides of the coil. Mohler, U.S. Pat. No. 6,507,257, discloses a bi-directional latching actuator that is comprised of an output shaft with one or more rotors fixedly mounted thereon. The shaft and rotor are mounted for rotation in a magnetically conductive housing having a cylindrical coil mounted therein and is closed by conductive end caps. The end caps have stator pole pieces mounted thereon. In one embodiment, the rotor has at least two oppositely magnetized permanent magnets which are asymmetrically mounted, i.e., they are adjacent at one side and separated by a non-magnetic void on the other side. The stator pole piece has asymmetric flux conductivity and in one embodiment is axially thicker than the remaining portion of the pole piece. An abutment prevents the rotor from swinging to the neutral position (where the rotor magnets are axially aligned with the higher conductivity portion of the pole piece). Thus, the rotor is magnetically latched in one of two positions being drawn towards the neutral position. Energization of the coil with an opposite polarity current causes the rotor to rotate towards its opposite latching position whereupon it is magnetically latched in that position. Mohler, U.S. Pat. No. 5,337,030, discloses a permanent magnet brushless torque actuator that is comprised of an electromagnetic core capable of generating an elongated toroidally shaped magnet flux field when energized. Outside the generally cylindrical coil is an outer housing with upper and lower end plates at each end. Mounted to the end plates and extending towards each other are stator pole pieces separated from its opposing pole piece by an air gap. A permanent magnet rotor is disposed in the air gap and mounted on a shaft which in turn is rotatably mounted in each of the end plates. The permanent magnet rotor comprises at least two permanent magnets, each covering an arcuate portion of the rotor and having opposite polarities. Energization of the coil with current in one direction magnetizes the pole pieces such that each of the two pole pieces attracts one of the magnets of the rotor and repels the other magnet of the rotor resulting in a torque generated by the output shaft. Reversal of the current flow results in a reversal of the torque and rotation of the rotor in the opposite direction. Preferred embodiments are disclosed having multiple cells, i.e. a plurality of stator rotor stator combinations and/or cells in which there are a plurality of pole pieces at each stator pole plane. Kloosterhouse et al, U.S. Pat. No. 5,191,255, discloses an electromagnetic motor that includes a rotor having a plurality of magnets mounted along a perimeter of the rotor. Preferably, adjacent magnets have opposite poles facing outward. One or more electromagnets are disposed adjacent to the perimeter of the rotor so that as the rotor rotates, the magnets mounted on the rotor are carried near the poles of the electromagnets. Current is supplied to the electromagnets by a drive circuit in a predetermined phase relationship with the rotation of the rotor such that, for substantially all angular positions of the rotor, magnetic attraction and repulsion between the poles of the electromagnets and the magnets mounted on the rotor urge the rotor to rotate in a desired direction. Reflective material is mounted on the rotor in predetermined angular positions. The drive circuit includes a photosensitive device which produces a signal whose value varies according to whether the device is receiving light reflected from the reflective material. The signal is amplified to produce drive current for the electromagnets. Westley, U.S. Pat. No. 4,623,809, discloses a stepper motor housing a pole structure in which a pair of identical stator plates, each having a plurality of poles, are positioned back to back with the poles projecting in opposite directions, the stator plates being positioned between a pair of substantially identical stator cups, each stator cup having a plurality of poles projecting inwardly from a back wall with a peripheral side wall terminating in an outwardly extending flange. A major surface of each flange is in contact with a face on one of the stator plates so as to assure a low reluctance magnetic path. Fawzy, U.S. Pat. No. 4,565,938, discloses an electromechanical device which can be used as a motor or as a generator. The device has a housing, including bearing means to support a rotatable shaft. Disc magnet means are provided, and poled to have alternating polarity and are mounted on the shaft to define a rotor. The device includes at least one first pole shoe in contact with the magnet means, having a portion extending radially therefrom to define a virtual pole chamber, of a first polarity. Also included is at least one second pole shoe in contact with the magnet and having a portion extending radially therefrom to define a virtual pole chamber of the other polarity. A toroid stator is mounted on the housing and has windings thereon. The stator is positioned annularly around the disc magnets such that the virtual pole chambers of the first and second pole shoes surround portions of said windings with circumferentially alternating fields of alternating polarity. Means are provided for electrical contact with the stator to draw off current when the device is operated as a generator, or provide current to operate the device as a motor. Fawzy, U.S. Pat. No. 4,459,501, discloses an electromechanical device which can be used as a motor or as a generator that has a housing, including bearing means to support a rotatable shaft. A pair of disc magnets are poled to have opposite polarity on the two faces of each. The magnets are mounted face to face together on the shaft to define a rotor. The device includes at least one first pole shoe in contact with one face of each magnet, and having a portion extending radially therefrom to define, in its preferred form, a pair of virtual pole chambers, of the same polarity as said one face. Also included is at least one second pole shoe in contact with the other face of each magnet and having a portion extending radially therefrom to define in its preferred form a pair of virtual pole chambers of the same polarity as the other face. A toroidal stator is mounted on the housing and has windings thereon. The stator is positioned annularly around the disc magnets such that the virtual pole chambers of the first and second pole shoes surround portions of said windings with circumferentially alternating fields of alternating polarity. Means for electrical contact with the stator draw off current when the device is operated as a generator, or provide current to operate the device as a motor.

Our prior art search with abstracts described above teaches rotating electromagnet machines; in both motor and generator forms. Thus, the prior art shows in Neal, a toroidal core with radial arc segments, in Fawzy, we see a N—N and S—S pole face adjacency, in Tu et al, a N—S and S—N pole adjacency with radial coil windings, in Rose, we find radially wound coils in sequence around a toroidal core and with permanent magnet segments with N—N and S—S adjacency. However, the prior art fails to teach a rotating electromagnetic machine that provides electromagnetic fields immersed in monopole permanent magnet fields of opposite polarities as is shown in the present apparatus and which provides operation by induction.

The present disclosure distinguishes over the prior art providing heretofore unknown advantages as described in the following summary.

SUMMARY

This disclosure teaches certain benefits in construction and use which give rise to the objectives described below.

An apparatus has a rotating element acting as a transfer bridge between two active energetic suppliers, the rotating element providing a ferromagnetic core with plural solenoid coils having induced electric energy from external permanent magnets; the core transferring energy by induction to the inner stator's wound active permanent magnet, the energy collector and inductor acting as a generator.

A primary objective inherent in the above described apparatus and method of use is to provide advantages not taught by the prior art.

Another objective is to provide an electromagnetic rotating machine which develops a DC output or accepts a DC input while acting by induction.

A further objective is to provide such a machine useful as an electric motor.

A further objective is to provide such a machine useful as an electric generator.

Other features and advantages of the described apparatus and method of use will become apparent from the following more detailed description, taken in conjunction with the accompanying drawings, which illustrate, by way of example, the principles of the presently described apparatus and method of its use.

BRIEF DESCRIPTION OF THE DRAWINGS

The accompanying drawings illustrate at least one of the best mode embodiments of the present apparatus and method of it use. In such drawings.

DETAILED DESCRIPTION

The above described drawing figures illustrate the described apparatus and its method of use in at least one of its preferred, best mode embodiments, which is further defined in detail in the following description. Those having ordinary skill in the art may be able to make alterations and modifications to what is described herein without departing from its spirit and scope. Therefore, it must be understood that what is illustrated is set forth only for the purposes of example and that it should not be taken as a limitation in the scope of the present apparatus and method of use.

Figure 1:
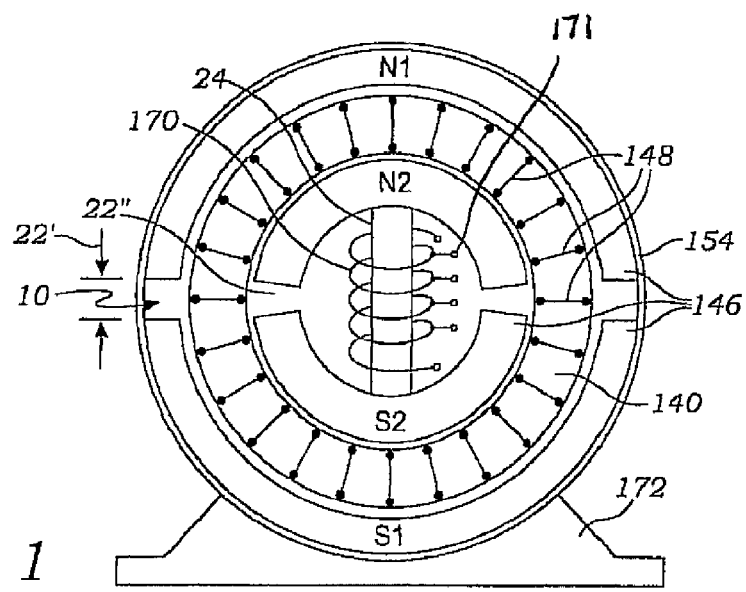
FIG. 1 is a vertical cross-sectional view taken in the lateral direction of the present apparatus.
Figure 2:
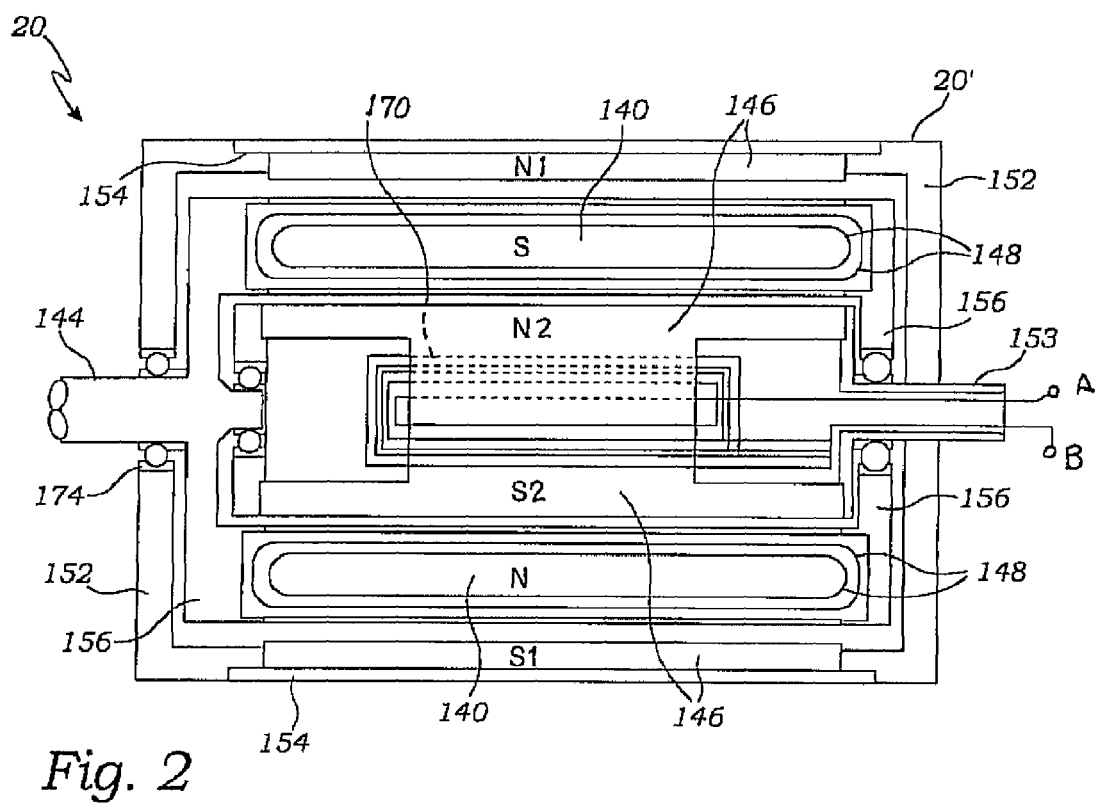
FIG. 2 is a vertical cross-sectional view taken in the longitudinal direction thereof.

FIGS. 1 and 2 are cross-sectional views of an embodiment of the apparatus defined in U.S. application Ser. No. 11/200,920 of which the present application is a Continuation-In-Part and which operates under the same principle. A linear-toroidal ferromagnetic core 140 is wound with a plurality of independent, radially oriented, spaced apart, short-circuited electric motor-generator solenoid coils 148. The core 140 functions as an autotransformer which rotates between permanent magnets 146 located externally and internally on stator supports 152 and 153. The internal permanent magnet 146 provides a south pole sector S2, a north pole sector N2 and a central portion 24 which joins the two pole sectors N2 and S2. An induction coil 170 is wound about central portion 24 and has several taps 171 as shown in FIG. 1. The induction coil 170 has current flow induced in it by the coils 148 as core 140 rotates. It is noted that permanent magnets N1 and S1 are separated by small gaps 22', and permanent magnets N2 and 52 are separated by small gaps 22". The rotating portion of the apparatus, i.e., rotor is shown by numeral 10. The induced portion of the core 140 that at any time is between S1 and S2 is an induced N pole and, likewise that portion of the core 140 that is between N1 and N2 is an induced S pole as is shown in FIG. 2.

Core 140 rotates, each of coils 148 independently and thereby receives induced electric energy from the external and internal permanent magnets 146 so that coils 148 become electromagnets. These electromagnets then transfer energy by induction in the form of electric current flow to the induction coil 170, which, in this case acts as a generator so that a load may be placed across terminals A and B shown in FIG. 2.

When functioning as an electric motor, the induction coil 170 is energized by a pulsed direct current at a selected frequency to produce a selected rotational speed of core 140. When charged by the induced electric energy from the induction coil 170, the coils 148 of the ferromagnetic core 140 have induced electric energy so that each coil 148 becomes an active electromagnet. The north and south poles of the coils 148 interact with the external and internal permanent magnets 146 and also with the ferromagnetic core 140 to produce a displacement of the core 140 during each pulse resulting in continuous rotation.

The special feature of the presently described cylindrical version of the present apparatus does not use a commutator as this function is carried out by the energy collector and inductor 170".

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. An electromagnetic apparatus comprising: a linear-toroidal ferromagnetic core wound with a plurality of independent, radially oriented, spaced apart, short-circuited solenoid coils; the core fixtured for rotation between permanent magnets located externally and internally on stator supports; the internal permanent magnets providing a south pole sector, a north pole sector and a central portion joining the two pole sectors; and an induction coil wound about the central portion and providing at least one tap.

2. The apparatus of claim 1 wherein the solenoid coils are placed within the core.

3. The apparatus of claim 1 wherein the core is inductively of an opposing pole sense to the internal and external permanent magnets.

4. The apparatus of claim 1 wherein the external and internal permanent magnets are placed with common poles adjacent thereby, by proximity, inducing an opposing pole in the ferromagnetic core.

5. A method of generating electrical current comprising the steps of: rotating a toroidal ferromagnetic core having plural radially oriented and spaced apart solenoid coils between stator permanent magnets external and internal to the core; inducing electric energy from the external and internal permanent magnets in the coils so the coils become electromagnets; transferring energy by induction in the form of electric current flow to an induction coil wound about a central portion of the internal permanent magnets; and placing a load across terminals brought from the induction coil.

6. The method of claim 5 further comprising the step of inducing an opposing pole sense in the solenoid coils relative to the internal and external permanent magnets.

7. A method of operating an electric motor comprising the steps of: providing a pulsed direct current at a selected frequency to terminals external to an induction coil wound about a central portion of an internal permanent magnet and thereby inducing a magnetic field and inducing solenoid function in plural radially oriented and spaced apart solenoid coils wound on a rotatable ferromagnetic core between stator permanent magnets external and internal to the core; the solenoid coils acting to produce a displacement of the core during each pulse resulting in continuous rotation.

8. The method of claim 7 further comprising the step of inducing an opposing pole sense in the solenoid coils relative to the internal and external permanent magnets.

\* \* \* \* \*